United States Patent
Park et al.

(10) Patent No.: US 10,047,472 B2
(45) Date of Patent: Aug. 14, 2018

(54) DISTANCE SENSOR AND WASHING MACHINE INCLUDING THE SAME

(71) Applicant: LG ELECTRONICS INC., Seoul (KR)

(72) Inventors: Youngbae Park, Seoul (KR); Youngjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 14/051,112

(22) Filed: Oct. 10, 2013

(65) Prior Publication Data

US 2014/0102149 A1    Apr. 17, 2014

(30) Foreign Application Priority Data

Oct. 12, 2012   (KR) .................. 10-2012-0113722

(51) Int. Cl.
*D06F 37/28* (2006.01)
*G01B 7/14* (2006.01)
*D06F 37/42* (2006.01)
*D06F 33/02* (2006.01)
*D06F 39/14* (2006.01)

(52) U.S. Cl.
CPC ............. *D06F 37/28* (2013.01); *D06F 33/02* (2013.01); *D06F 37/42* (2013.01); *G01B 7/14* (2013.01); *D06F 39/14* (2013.01); *D06F 2204/086* (2013.01); *D06F 2224/00* (2013.01)

(58) Field of Classification Search
CPC .......... D06F 37/28; D06F 37/12; D06F 33/02; D06F 39/14; D06F 2204/086; D06F 2224/00; G01B 7/14

USPC ..................... 68/12.26; 324/207.11
See application file for complete search history.

(56) References Cited

U.S. PATENT DOCUMENTS

| | | | | |
|---|---|---|---|---|
| 4,379,577 A | * | 4/1983 | Robertson ............. | E05B 63/128 292/170 |
| 5,315,847 A | * | 5/1994 | Takeda .................. | G01N 27/07 324/439 |
| 5,541,562 A | | 7/1996 | Fletcher et al. .............. | 335/205 |

(Continued)

FOREIGN PATENT DOCUMENTS

| CN | 1156195 A | 8/1997 |
|---|---|---|
| DE | 10 2006 052 428 A1 | 5/2008 |

(Continued)

OTHER PUBLICATIONS

Chinese Office Action dated Jun. 26, 2015 issued in Application No. 201310476086.0.

(Continued)

*Primary Examiner* — Michael E Barr
*Assistant Examiner* — Tinsae B Ayalew
(74) *Attorney, Agent, or Firm* — Ked & Associates, LLP

(57) ABSTRACT

A distance sensor and a washing machine including the distance sensor are provided. The washing machine may include a main body having a laundry loading hole formed therein, a door coupled to the main body, at a position corresponding to the laundry loading hole, and a plurality of reed sensors. The door may include a magnet disposed therein. The plurality of reed sensors provided in the main body and react to the magnet provided in the door to determine an open/closed state of the door.

16 Claims, 14 Drawing Sheets

(56) References Cited

U.S. PATENT DOCUMENTS

| | | | | |
|---|---|---|---|---|
| 5,684,441 A | * | 11/1997 | Graeber | ................ H01H 51/28 335/151 |
| 5,870,787 A | | 2/1999 | Choi | ................................ 8/159 |
| 2004/0032311 A1 | * | 2/2004 | Forsythe | ............... H01H 15/06 335/207 |

FOREIGN PATENT DOCUMENTS

| | | | |
|---|---|---|---|
| JP | 2005-174667 A | | 6/2005 |
| JP | 2005174667 A | * | 6/2005 |

OTHER PUBLICATIONS

European Search Report dated Feb. 13, 2014, issued in Application No. 13 18 7809.

* cited by examiner

DISTANCE SENSOR AND WASHING MACHINE INCLUDING THE SAME

CROSS-REFERENCE TO RELATED APPLICATION(S)

This application claims priority under 35 U.S.C. § 119 to Korean Application No. 10-2012-0113722 filed in Korea on Oct. 12, 2012, whose entire disclosure is hereby incorporated by reference.

BACKGROUND

1. Field

This relates to a washing machine, and more particularly, to sensors for a washing machine.

2. Background

Sensors may be used in a laundry treating apparatus, such as a washing machine, to detect a state of a door coupled to a main body, such as, for example, an open or a closed state of the door. This information may be used in controlling operation of the washing machine. Thus, reliability and durability of such sensors is desirable.

BRIEF DESCRIPTION OF THE DRAWINGS

The embodiments will be described in detail with reference to the following drawings in which like reference numerals refer to like elements wherein.

DETAILED DESCRIPTION

Figure 1:
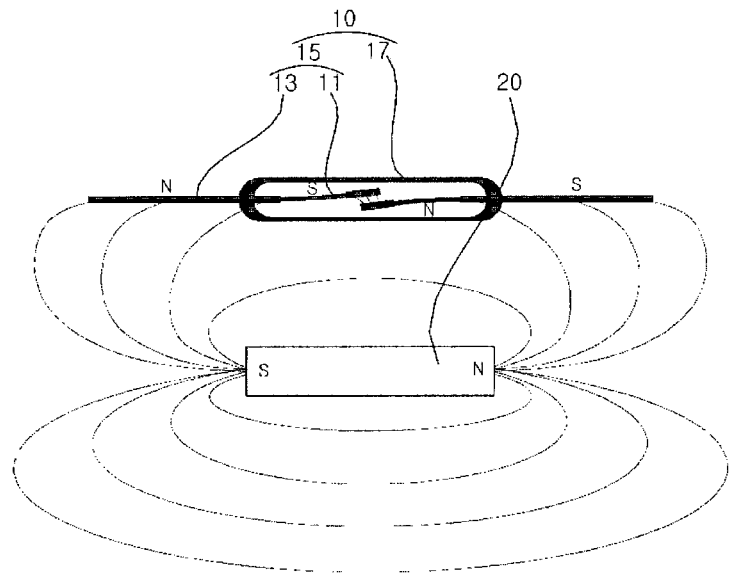
FIG. 1 illustrates a relationship between an exemplary reed sensor and an exemplary magnet.

The foregoing and other objects, features, aspects and advantages of the various will become more apparent from the following detailed description of the embodiments taken in conjunction with the accompanying drawings. Embodiments may have many different forms and should not be construed as being limited to the embodiments set forth herein. Rather, these embodiments are provided so that this disclosure will be thorough and complete, and will fully convey the scope to those skilled in the art. In the drawings, the shapes and dimensions may be exaggerated for clarity, and the same reference numerals will be used throughout to designate the same or like components.

Referring to FIG. 1, reed pieces 15 may be formed of a magnetic substance. A portion of the reed piece 15 is enclosed in a sealed glass tube 17. An inert gas is filled in the glass tube 17. As shown in FIG. 1, two reed pieces 15 may be disposed inside the glass tube 17. The two reed pieces 15 are spaced from each other by a certain distance. When a magnet 20 approaches the reed pieces 15, the reed pieces 15 are magnetized. The two reed pieces 15 are magnetized and have different polarities. When a magnetic force exceeds an elastic force, the two reed pieces 15 may contact each other. When the magnet 20 recedes from two reed pieces 15, the magnetic force weakens, and thus two reed pieces 15 are restored by the elastic force. Accordingly, the reed sensor 10 emits an on- or off-signal according to the distance of the reed sensor 10 from the magnet 20. However, when the magnetization time of the reed pieces 15 is increased, the reed pieces 15 may remain in the magnetization state even in a case where the magnet 20 deviates by a certain distance. In this case, the reliability of the reed sensor 10 may be reduced.

Figure 2:
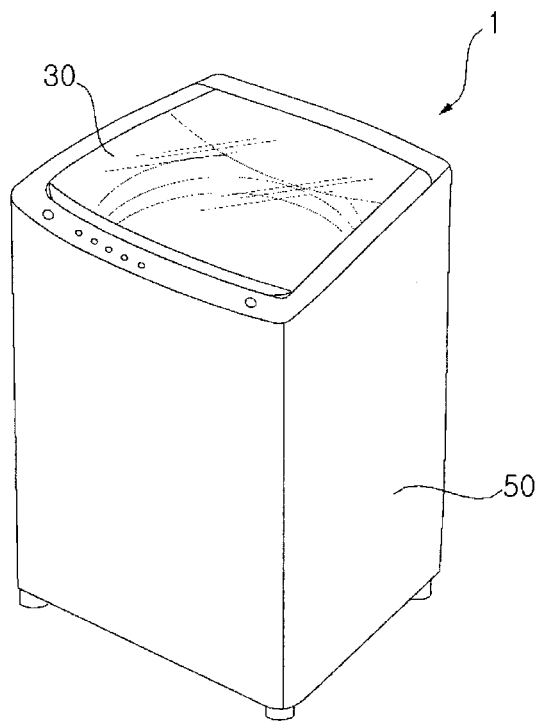
FIG. 2 is a perspective view of a main body and a door of a washing machine according to an embodiment as broadly described herein.
Figure 3:
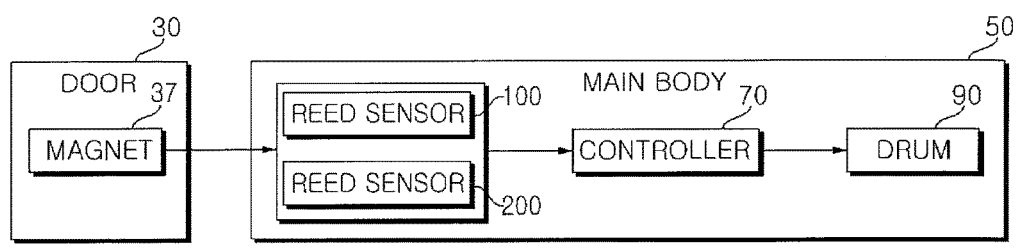
FIG. 3 illustrates a relationship between reed sensors and components adjacent thereto according to an embodiment as broadly described herein.
Figure 4:
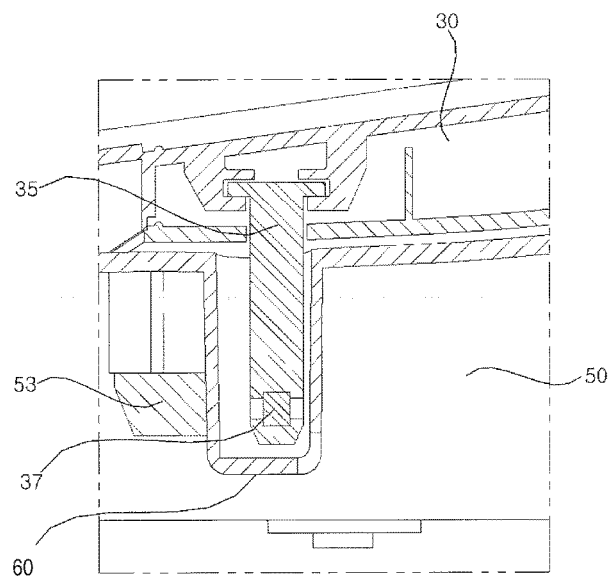
FIG. 4 is a side cross-sectional view of a sensor housing and components adjacent thereto according to an embodiment as broadly described herein.

Referring to FIGS. 2 to 4, a washing machine 1 according to an embodiment as broadly described herein may include a main body 50 having a laundry loading hole for laundry, a door 30 opening/closing the laundry loading hole and including at least one magnet 37 disposed therein, and a plurality of reed sensors 100 and 200 reacting to the magnet 37 mounted in the door 30.

The laundry loading hole of the main body 50 of the washing machine 1 may be formed at the front surface of the main body 50 or at the top surface of the main body 50. The technical spirit of embodiments as broadly described herein may be applied without being limited to the location of the laundry loading hole. Hereinafter, the laundry loading hole will be exemplified as being formed at the top surface of the main body 50, simply for convenience of explanation.

The laundry loading hole may be formed in the main body 50. The door 30 may be coupled to the main body 50, at a position corresponding to the laundry loading hole. In one embodiment, the laundry loading hole may be formed in the top surface of the main body 50. The door 30 may be coupled to the top surface of the main body by a hinge. The rotation axis of the door 30 may be disposed at a rear side of the main body 50. The door 30 may open or close the laundry loading hole. The laundry loading hole may be opened or closed by the door 30.

In one embodiment, the door 30 may include at least one magnet 37 disposed therein. However, the magnet 37 may also be disposed in the main body 50, and the reed sensors 100 and 200 may be disposed in the door 30. It maybe understood by those skilled in the art that the technical spirit of the embodiments as broadly described herein may be applied even when the arrangement of the magnet 37 and the reed sensors 100 and 200 are switched. Simply for ease of explanation and understanding, the following description will be made based on the former. The magnet 37 may be disposed at the front side of the door 30. The magnet 37 may be disposed at the side surface of the door 30. The magnet 37 may be pivotably disposed with respect to the side surface of the main body 50.

The magnet 37 may be an electromagnet. The magnet 37 may be a permanent magnet. The intensity and arrangement of the magnet 37 may vary with a distance from the reed sensors 100 and 200. The intensity and arrangement of the magnet 37 may vary with the type of the reed sensors 100 and 200.

In one embodiment, the reed sensors 100 and 200 may be disposed in plurality. The reed sensors 100 and 200 that are connected in plurality may react to the magnet 37. The reed sensors 100 and 200 may react to one magnet 37. The reed sensors 100 and 200 may substantially simultaneously react to one magnet 37.

The reed sensors 100 and 200 may be disposed inside sensor housings 53, 55, 57 and 59 (see FIGS. 4 and 13A-13C, respectively). The sensor housings 53, 55, 57 and 59 may be disposed in the main body 50. The sensor housings 53, 55, 57 and 59 may be disposed within a certain distance from the magnet 37 disposed in the door 30. The sensor housings 53, 55, 57 and 59 may be disposed at an upper side of the main body 50.

The reed sensors 100 and 200 may react to the magnet 37 disposed in the door 30. The reed sensors 100 and 200 may be connected to a controller 70. The reed sensors 100 and 200 may deliver data related to the opening/closing of the door 30 to the controller 70. The controller 70 may be connected to the reed sensors 100 and 200. The controller 70 may be connected to a drum 90 provided in the main body 50 of the washing machine 1.

The controller 70 may determine whether or not the door 30 is opened. The controller 70 may determine whether or not the drum 90 operates. The controller 70 may stop operation of the drum 90. The controller 70 may stop a wash course being performed. The controller 70 may stop supplying wash water. The controller 70 may determine whether to stop all operations and cycles of the washing machine 1. The controller 70 may determine whether to start all operations and cycles of the washing machine 1.

The drum 90 may be rotatably disposed in the main body 50 to receive laundry therein. When one of the plurality of reed sensors 100 and 200 senses the opening of the door 30, the operating (rotation) of the drum 90 may be stopped.

When any one of the reed sensors 100 and 200 senses the opening of the door 30, the controller 70 may stop the operating of the drum 90. When any one of the reed sensors 100 and 200 delivers a different signal, the controller 70 may determine that the door 30 is opened. When the reed sensor 100 or 200 disposed farthest from the magnet 37 senses the opening of the door 30, the reed sensor 100 or 200 disposed closest to the magnet 37 may also sense the opening of the door 30.

In one embodiment, the reed sensors 100 and 200 may react to one magnet 37. When the reed sensor 100 or 200 disposed farthest from the magnet 37 reacts to the magnet 37, the reed sensor 100 or 200 disposed closest to the magnet 37 may also react to the magnet 37. The reed sensors 100 and 200 may substantially simultaneously react to one magnet 37.

In another embodiment, a plurality of magnets 37 may be provided. In this case, the reed sensors 100 and 200 may be disposed in plurality for each magnet 37. FIGS. 5A-5E illustrate exemplary arrangements of magnets 37 and reed sensors 100 and 200 according to various embodiments.

Referring to FIGS. 5A-5E, the magnet 37 and the reed sensors 100 and 200 may be disposed in various forms. In one embodiment, since the magnet 37 is mounted in the door 30, when viewed from the side, the magnet 37 may pivot with respect to the reed sensors 100 and 200. However, in order to help understanding of the present invention, the arrangement relation between the reed sensors 100 and 200 and the magnet 37 is simply shown at an upper or lower portion. Referring to FIGS. 5A to 5E, the arrangement of the reed sensors 100 and 200, the arrangement of the magnet 37, and the interaction therebetween may be variously configured.

As shown in the drawings, the magnet 37 may travel in one direction relative to the reed sensors 100 and 200. Even in this case, the reed sensors 100 and 200 may be magnetized by the magnet 37. This means that the arrangement of the reed sensors 100 and 200 and the magnet 37 or the traveling direction of the magnet 37 are not limited to a specific form.

Figure 5A:
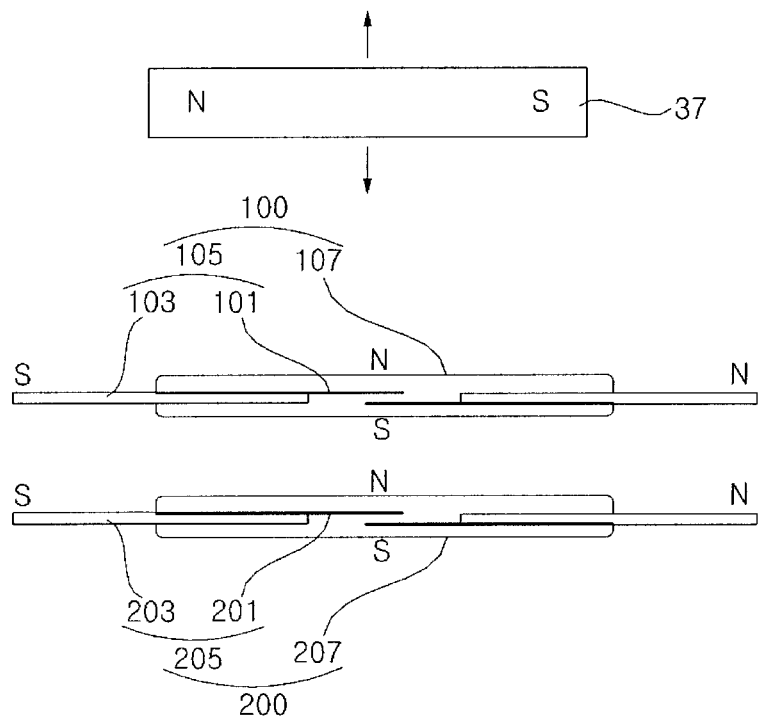
FIGS. 5A-5E illustrate exemplary arrangements of magnets and reed sensors according to various embodiments as broadly described herein.
Figure 5B:
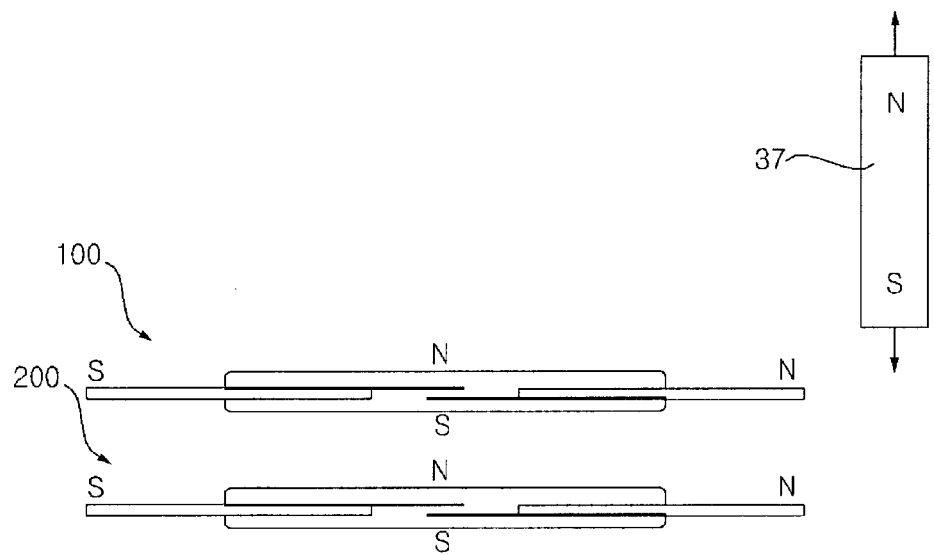
Figure 5C:
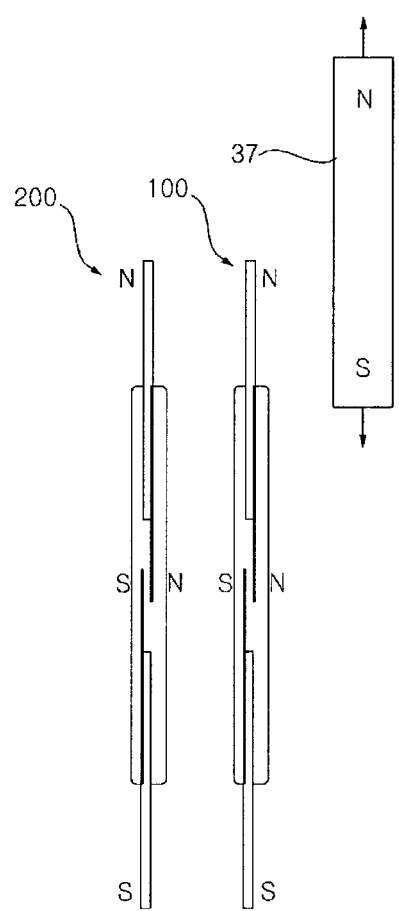
Figure 5D:
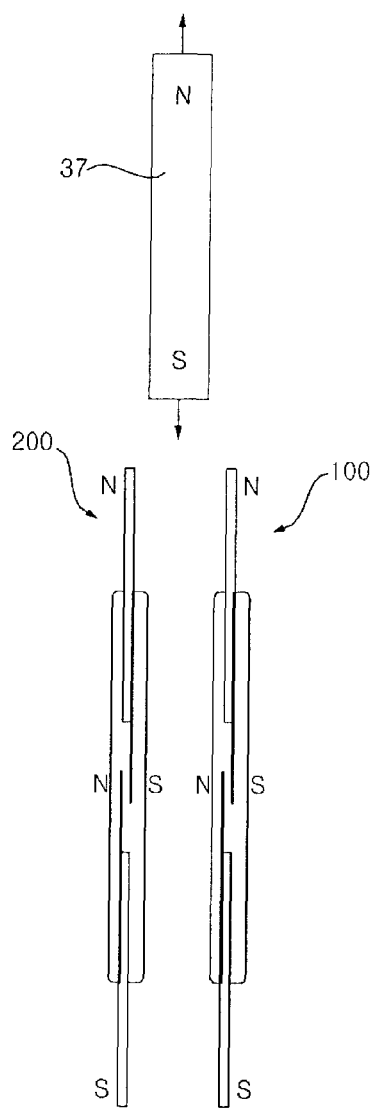
Figure 5E:
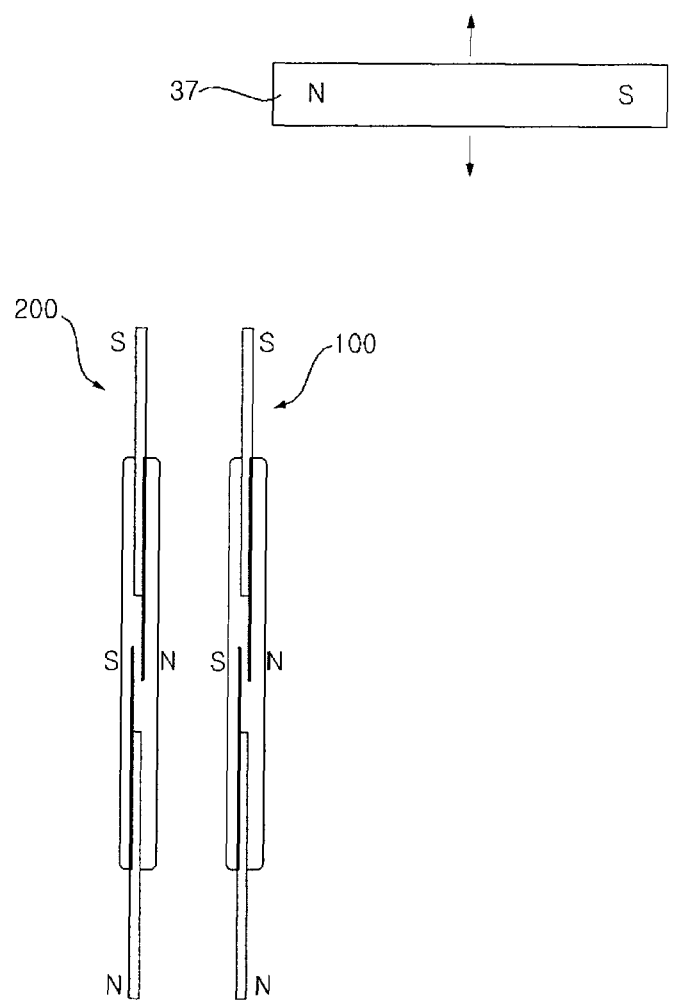

The reed sensors 100 and 200 and the magnet 37 may be disposed as shown in FIG. 5A. The longitudinal direction of the magnet 37 and the longitudinal direction of the reed sensors 100 and 200 may be arranged in parallel. The traveling direction of the magnet 37 may be perpendicular to the longitudinal direction of the reed sensors 100 and 200. The center of the magnet 37 may be aligned with the center of the reed sensors 100 and 200. The center of the magnet 37 may move to contact parts 101 and 201 of the reed sensors 100 and 200.

In one embodiment, the reed sensors 100 and 200 may include sealed tubes 107 and 207, magnetization parts 105 and 205 magnetized by the magnet 37 and having a portion thereof inserted into both sides of the sealed tubes 107 and 207. The magnetization parts 105 and 205 may include contact parts 101 and 201 disposed inside the sealed tubes 107 and 207 to be switched and mounting parts 103 and 203 connected to the contact parts 101 and 201 and protruding out of the sealed tubes 107 and 207.

The sealed tubes 107 and 207 may prevent infiltration of foreign substances. The sealed tubes 107 and 207 may be formed of glass. The sealed tubes 107 and 207 may be in a vacuum state. The sealed tubes 107 and 207 may be filled with an inert gas.

The magnetization parts 105 and 205 may be inserted into the two opposite ends of each of the sealed tubes 107 and 207. The contact parts 101 and 201 may be disposed inside the sealed tubes 107 and 207. The mounting parts 103 and 203 may protrude out of the sealed tubes 107 and 207.

The magnetization parts 105 and 205 may be reed pieces. The magnetization parts 105 and 205 may be reed elements. The magnetization parts 105 and 205 may be magnetized by the magnet 37. The magnetization parts 105 and 205 may be ferromagnetic substances. The magnetization parts 105 and 205 may have an elastic force. The contact parts 101 and 201 may be disposed inside the sealed tubes 107 and 207. The contact parts 101 and 201 may be disposed spaced from each other.

The contact parts 101 and 201 may have an elastic force. The contact parts 101 and 201 may be disposed at both ends of the inside of the sealed tubes 107 and 207. The contact parts 101 and 201 may be horizontally disposed inside the sealed tubes 107 and 207. The contact parts 101 and 201 may react when the magnet 37 approaches the contact parts 101 and 201 within a certain distance. The contact parts 101 and 201 may react when the magnet 37 deviates from the contact parts 101 and 201 by a certain distance. The contact parts 101 and 201 may contact each other when the magnet 37 approaches the contact parts 101 and 201 within a certain distance.

The contact parts 101 and 201 may be short-circuited when the magnet 37 approaches the contact parts 101 and 201 within a certain distance. The contact parts 101 and 201 may be spaced from each other when the magnet 37 deviates from the contact parts 101 and 201 by a certain distance. The distances by which the contact parts 101 and 201 contact each other and move away from each other may be different from each other. These distances may vary with the intensity of the magnetic force, and the magnetic properties of the magnetization parts 105 and 205, and the elastic force of the magnetization parts 105 and 205.

The mounting parts 103 and 203 may be connected to the contact parts 101 and 201. The mounting parts 103 and 203 may protrude out of the sealed tubes 107 and 207. The mounting parts 103 and 203 may be connected to a circuit. The mounting parts 103 and 203 may be connected to circuit boards 300 and 350 (see FIGS. 8-12). The ends of the mounting parts 103 and 203 may be bent by a clamp device. The mounting parts 103 and 203 may be bent to have an L-shape, and may be mounted in the circuit boards 300 and 350.

In one embodiment, as the reed sensors 100 and 200 are disposed farther from the magnet 37, the length of the magnetization parts 105 and 205 may be elongated. When the length of the magnetization parts 105 and 205 is long, the intensity of magnetization may increase. The magnetization parts 105 and 205 may be the length of reed pieces. The magnetization parts 105 and 205 may be the length of reed elements. The magnetization parts 105 and 205 may be ferromagnetic substances connected to the reed elements.

In another embodiment, as the reed sensors 100 and 200 are disposed farther from the magnet 37, the length of the mounting parts 103 and 203 may be elongated. When the length of the mounting parts 103 and 203 is long, the intensity of magnetization may increase. A portion of the mounting parts 103 and 203 may be bent. The end of the bent portion may be mounted in the circuit boards 300 and 350.

The mounting parts 103 and 203 may be a portion that is magnetized by the magnet 37 among a portion protruding out of the sealed tubes 107 and 207. The mounting parts 103 and 203 may be ferromagnetic substances connected to the portion protruding out of the sealed tubes 107 and 207.

FIGS. 5B-5E illustrate numerous other possible arrangements of the magnet 37 relative to the reed sensors 100 and 200, which may produce the effects described above.

Figure 6:
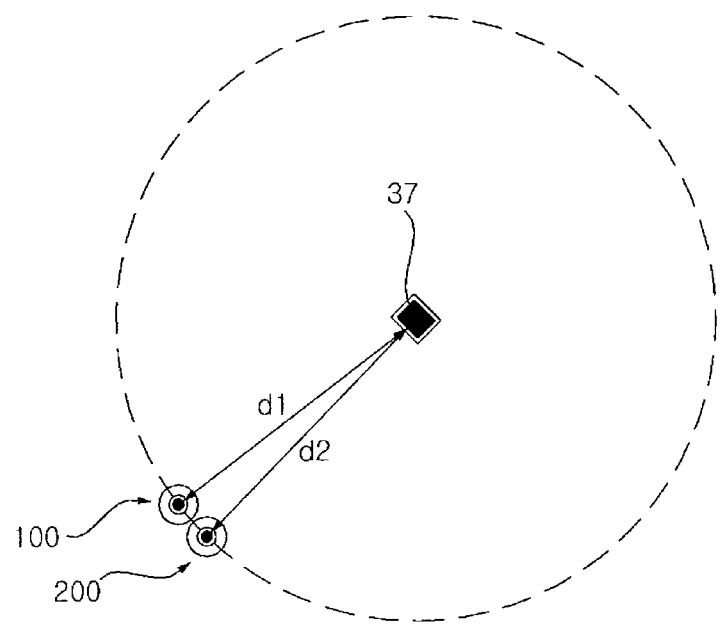
FIG. 6 is a side view of a relationship between a magnet and reed sensors according to an embodiment as broadly described herein.
Figure 7:
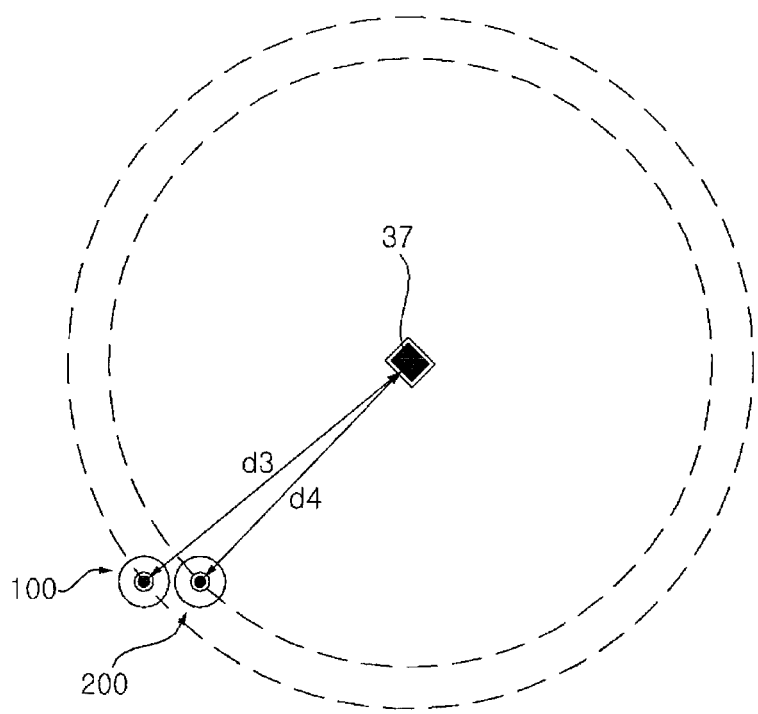
FIG. 7 is a side view of a relationship between a magnet and reed sensors according to another embodiment as broadly described herein.

FIGS. 6 and 7 are side views of a relationship between the magnet 37 and the reed sensors 100 and 200 according to embodiments as broadly described herein. Referring to FIGS. 6 and 7, the magnet 37 may move pivotably toward the reed sensors 100 and 200. The magnet 37 may magnetize a magnetic substance within a certain distance. The magnet 37 may first magnetize a magnetic substance that is closer to the magnet 37. The reed sensors 100 and 200 disposed closer to the magnet 37 may be magnetized first.

A plurality of reed sensors, for example, the reed sensors 100 and 200, disposed at the same distance from the magnet 37 may be simultaneously magnetized. The reed sensors 100 and 200 may be magnetized when located within a certain distance from the magnet 37. The reed sensors 100 and 200 may be magnetized by the magnet 37. When the contact parts 101 and 201 included in the reed sensors 100 and 200 have a sufficient magnetic force, the contact parts 101 and 201 may contact each other.

The contact parts 101 and 201 may be magnetized to have different polarities. When the magnetic force acting between the contact parts 101 and 201 is sufficiently strengthened, the contact parts 101 and 201 may contact each other. When the magnetic force acting between the contact parts 101 and 201 becomes stronger than an elastic force of the contact parts 101 and 201, the contact parts 101 and 201 may contact each other. As a distance from the magnet 37 decreases, the magnetic force acting between the contact parts 101 and 201 may become stronger. As the distance from the magnet 37 increases, the magnetic force acting between the contact parts 101 and 201 may become weaker. When the distance between the reed sensors 100 and 200 and the magnet 37 increases, the contact parts 101 and 201 may separate from each other.

The contact parts 101 and 201 of the reed sensors 100 and 200 may contact each other when the magnet 37 is within a certain distance. Hereinafter, when the contact parts 101 and 201 of the reed sensors 100 and 200 contact each other due to the magnet 37 for the first time, distances between the center of the reed sensors 100 and 200 and the magnet 37 will be defined as working distances d1 and d2.

In certain embodiments, the reed sensors 100 and 200 may be obliquely disposed. The reed sensors 100 and 200 may have different working distances d1 and d2. In alternative embodiments, the reed sensors 100 and 200 may have the same working distance d1 and d2. When the reed sensors 100 and 200 operate, the distances between each of reed sensors 100 and 200 and the magnet 37 may be equal to each other.

The reed sensors 100 and 200 may substantially simultaneously react to the magnet 37. All of the reed sensors 100 and 200 may be disposed within the same working distance d1 and d2 from the magnet 37. The distance d1 may be a distance between the center of the reed sensor 100 and the magnet 37. The distance d2 may be a distance between the reed sensor 200 and the magnet 37. When the magnet 37 falls within the distance d1, the contact part 101 of the reed sensor 100 may contact the contact part 201 of the reed sensor 200. When the magnet 37 falls within the distance d2, the contact part 201 of the reed sensor 200 may contact the contact part 101 of the reed sensor 100. The distances d1 and d2 may be set to be equal to each other. The reed sensors 100 and 200 may be obliquely disposed. The reed sensors 100 and 200 may be obliquely disposed inside sensor housings 53, 55, 57 and 59. The reed sensors 100 and 200 may be obliquely disposed so as to simultaneously react to the magnet 37. When one of the reed sensors 100 and 200 reacts to the magnet 37, inclination distances between each of the reed sensors 100 and 200 and the magnet 37 may be equal to each other. The distances d1 and d2 may be inclination distances between the reed sensors 100 and 200 and the magnet 37.

As a horizontal distance between the reed sensors 100 and 200 and the magnet 37 decreases, the reed sensors 100 and 200 may be disposed at a lower end portion of the rear side. As the horizontal distance between the reed sensors 100 and 200 and the magnet 37 decreases, the reed sensors 100 and 200 may be disposed at a lower end portion. As the horizontal distance between the reed sensors 100 and 200 and the magnet 37 increases, the reed sensors 100 and 200 may be disposed at an upper end portion. As the reed sensors 100 and 200 get closer to the pivot of the door 30, the reed sensors 100 and 200 may be disposed at a lower end portion. The reed sensors 100 and 200 may be diagonally disposed.

Referring to FIG. 7, working distances d3 and d4 of the reed sensors 100 and 200 may differ from each other. The distances d3 and d4 may be different from each other. Although the distances d3 and d4 are different from each other, the reed sensors 100 and 200 may substantially simultaneously react to the magnet 37. The distance d4 may be a distance between the reed sensor 200 closer to the magnet 37. The distance d3 may be a distance between the reed sensor 100 farther from the magnet 37. The distance d3 may be greater than the distance d4. When a magnetic force applied to the reed sensor 100 farther from the magnet 37 is stronger than a magnetic force applied to the reed sensor 200 closer to the magnet 37, the reed sensors 100 and 200 may substantially simultaneously operate even though the working distances d3 and d4 are different from each other.

When an elastic force of a reed element of the reed sensor 100 farther from the magnet 37 is weaker than an elastic force of a reed element of the reed sensor 200 closer to the magnet 37, the reed sensors 100 and 200 may substantially simultaneously operate even though the working distances d3 and d4 are different from each other.

The magnitude of the magnetic force or the elastic force may be related to the material of the reed element, the degree of plating, and the length of the reed element. In certain embodiments, the reed element, the reed piece, and the magnetization parts may refer to the same component.

The magnet 37 may move pivotably toward the reed sensors 100 and 200. The magnet 37 may move pivotably toward one side of the reed sensors 100 and 200. The magnet 37 may move pivotably toward the centers of the reed sensors 100 and 200.

Figure 8:
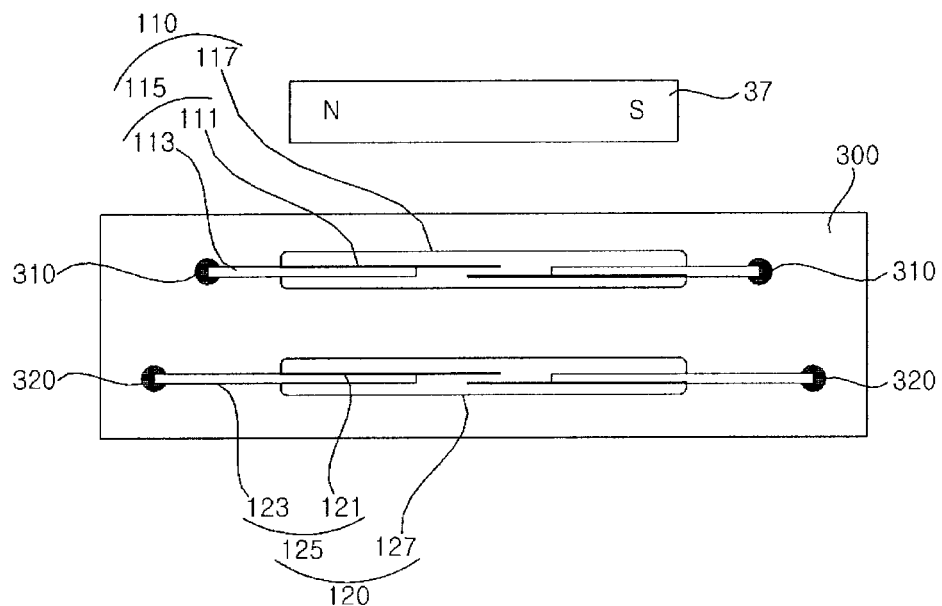
FIG. 8 illustrates reed sensors mounted in a circuit board according to an embodiment as broadly described herein.
Figure 9A:
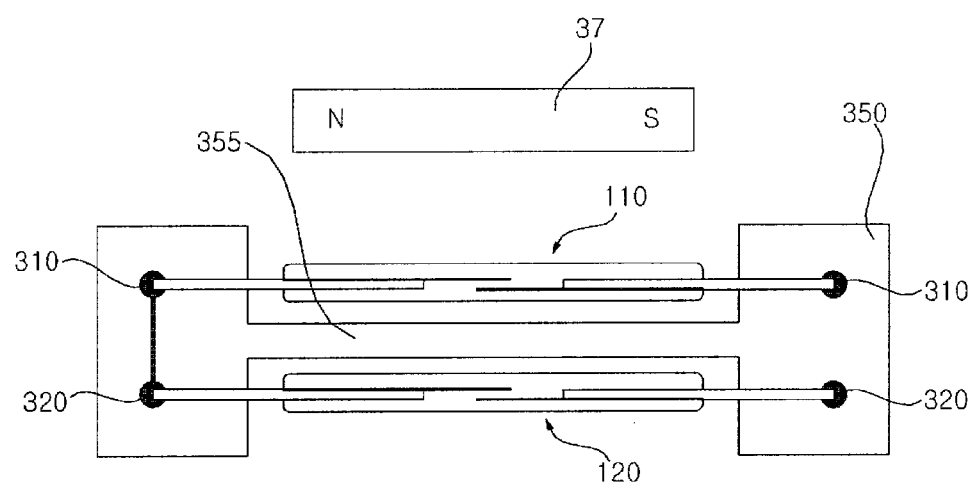
FIGS. 9A-9C illustrate reed sensors mounted in a circuit board according to another embodiment as broadly described herein.
Figure 9B:
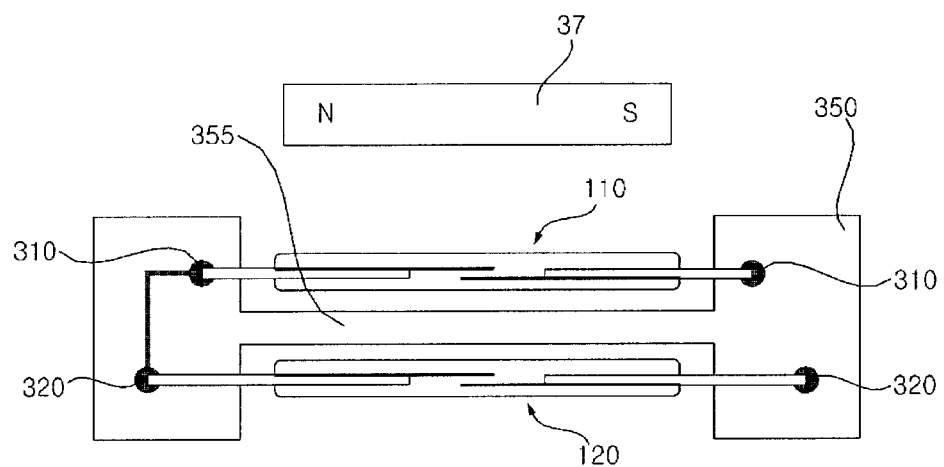
Figure 9C:
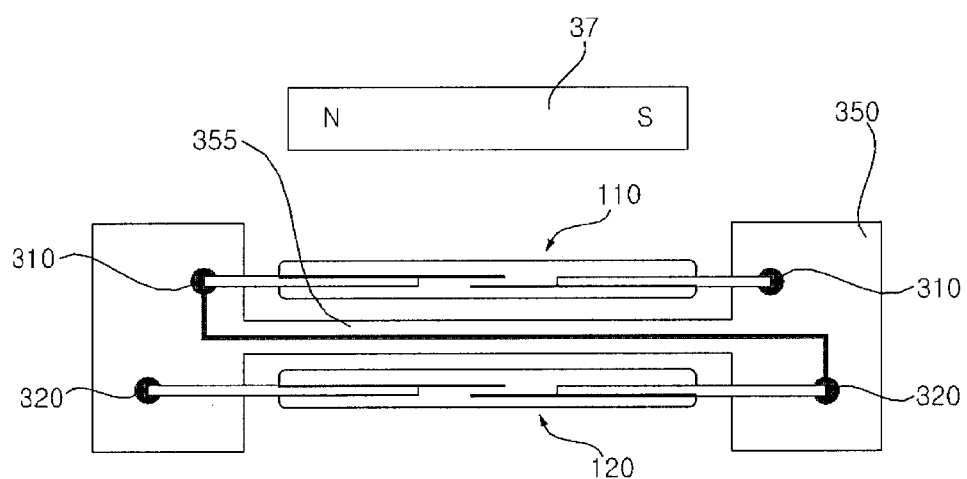

FIG. 8 illustrates an arrangement of reed sensors 110 and 120 according to distances between the magnet 37 and the reed sensors 110 and 120, and FIGS. 9A-9C illustrate reed sensors 110 and 120 mounted in circuit boards 300 and 350 according to embodiments as broadly described herein.

The reed sensors 110 and 120 may be connected to each other. The reed sensors 110 and 120 may be connected in series or in parallel to each other. The reed sensors 110 and 120 connected in series may be electrically connected to the controller 70.

Referring to FIGS. 8 and 9A-9C, the reed sensors 110 and 120 may include a first reed sensor 110 and a second reed sensor 120 connected to the first reed sensor 110. The first and second reed sensors 110 and 120 may be arranged in parallel in a longitudinal direction. The second reed sensor 120 may be disposed in a radial direction of the first reed sensor 110.

The first reed sensor 110 may be connected to the second reed sensor 120. The first reed sensor 110 may be connected in series to the second reed sensor 120. When any one of the reed sensors is disconnected, the whole signal connection may be interrupted. When at least one of the reed sensors senses the opening of the door 30, the operation of the drum 90 may be stopped. The first reed sensor 110 and the second reed sensor 120 may be connected in parallel in a longitudinal direction.

The second reed sensor 120 may be disposed in a radial direction of the first reed sensor 110. In certain embodiments, a third reed sensor may be disposed in a radial direction of the second reed sensor 120. Other embodiments may include a plurality of reed sensors, the reed sensors should not be construed as meaning only two reed sensors. For example, three or more reed sensors may be provided. The center of the reed sensors 110 and 120 may be disposed toward the center of the magnet 37. The center of the reed sensors 110 and 120 may be disposed toward the traveling direction of the magnet 37. The centers of the reed sensors 110 and 120 may be disposed in a line. A straight line connecting the centers of the reed sensors 110 and 120 may penetrate the door 30. The centers of the first reed sensor 110 and the second reed sensor 120 may be disposed in a line. The length of a reed element of the first reed sensor 110 may be different from the length of a reed element of the second reed sensor 120.

The length of a reed piece of the first reed sensor 110 may be different from the length of a reed piece of the second reed sensor 120. The length of the magnetization part 115 of the first reed sensor 110 may be different from the length of the magnetization part 125 of the second reed sensor 120. The length of the mounting part 113 of the first reed sensor 110 may be different from the length of the mounting part 123 of the second reed sensor 120.

The lengths of the reed element, the reed piece, the magnetization parts 105, 205, 115 and 125, and the mounting parts 103, 203, 113 and 123 may vary according to the working distances d1, d2, d3 and d4 with respect to the magnet 37. When the reed sensors 110 and 120 are horizontally disposed, the lengths of the reed element, the reed piece, the magnetization parts 115 and 125, and the mounting parts 113 and 123 may increase as the horizontal distance from the magnet 37 increases.

The magnet 37 may pivotably move toward the first reed sensor 110 and the second reed sensor 120. The magnet 37 may pivotably move toward one side of the first reed sensor 110 and the second reed sensor 120. Alternatively, the magnet 37 may pivotably move toward the centers of the first reed sensor 110 and the second reed sensor 120.

The first reed sensor 110 and the second reed sensor 120 may be longitudinally disposed in a horizontal direction. The magnet 37 may be disposed in forward and backward directions. The magnet 37 may be disposed in a horizontal direction.

In one embodiment, the washing machine 1 may further include circuit boards 300 and 350 in which the reed sensors 110 and 120 are mounted. The reed sensors 110 and 120 may be mounted in the circuit boards 300 and 350. The mounting parts 113 and 123 of the reed sensors 110 and 120 may be mounted in the circuit boards 300 and 350. The circuit boards 300 and 350 may have a first insertion hole(s) 310 into which the two ends of the first reed sensor 110 are respectively inserted and a second insertion hole(s) 320 into which the two ends of the second reed sensor 120 are inserted. The mounting part 113 of the first reed sensor 110 may be inserted into the first insertion hole 310. The mounting parts 123 of the second reed sensor 120 may be inserted into the second insertion hole 320.

The circuit boards 300 and 350 may be configured such that the first reed sensor 110 and the second reed sensor 120 are connected in series. The circuit boards 300 and 350 may be configured such that one of the first insertion holes 310 and one of the second insertion holes 320 are connected in series. The circuit boards 300 and 350 may be configured such that a current flows from one of the first insertion holes 310 to one of the second insertion holes 320 located in a diagonal direction of the first insertion hole 310. The first insertion hole 310 and the second insertion hole 320 may be electrically connected to each other in a diagonal direction.

In one embodiment, the distance between the first reed sensor 110 and the magnet 37 may be smaller than the distance between the second reed sensor 120 and the magnet 37. The interval between the first insertion holes 310 may be smaller than the interval between the second insertion holes 320.

Referring to FIGS. 9A-9C, the circuit board 350 may have a dumbbell shape. The first insertion holes 310 and the second insertion holes 320 may be formed at both ends of the circuit board 350. The first reed sensor 110 and the second reed sensor 120 may be disposed in parallel across a bridge 355 formed at the center of the circuit board 350, extending between the two opposite ends thereof.

The circuit board 350 may have a dumbbell shape. The first insertion holes 310 and the second insertion holes 320 may be formed at both ends of the circuit board. A bridge 355 may be disposed across the circuit board 350.

The first insertion holes 310 may be formed at the right and left sides of the bridge 355. The second insertion holes 320 may be formed at the right and left sides of the bridge 355. The first reed sensor 110 and the second reed sensors 100 and 200 may be disposed in parallel with each other, and with the bridge 355. A circuit connecting the first insertion hole 310 and the second insertion hole 320 may be formed at the bridge 355. One side of the first insertion hole 310 may be connected to the second insertion hole 320. The circuit may be formed on the bridge 355.

Figure 10:
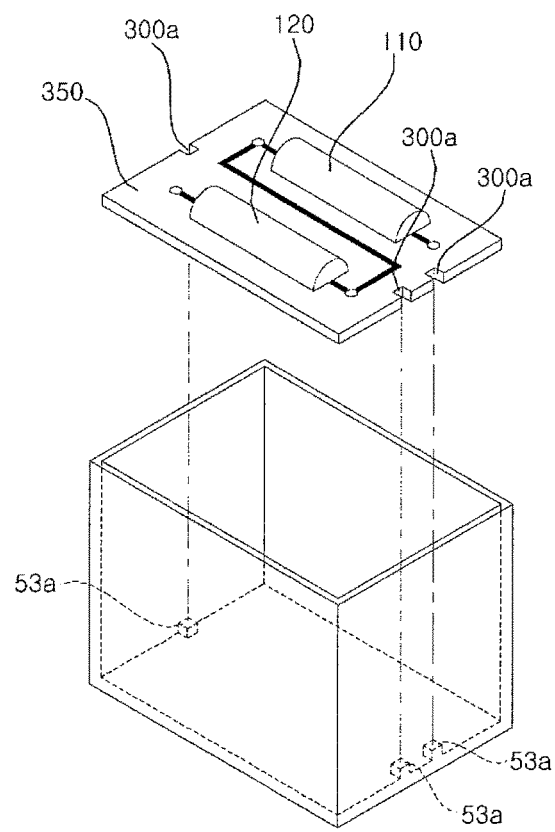
FIG. 10 is an exploded perspective view of an assembling relationship between a circuit board and a sensor housing according to an embodiment as broadly described herein.
Figure 13A:
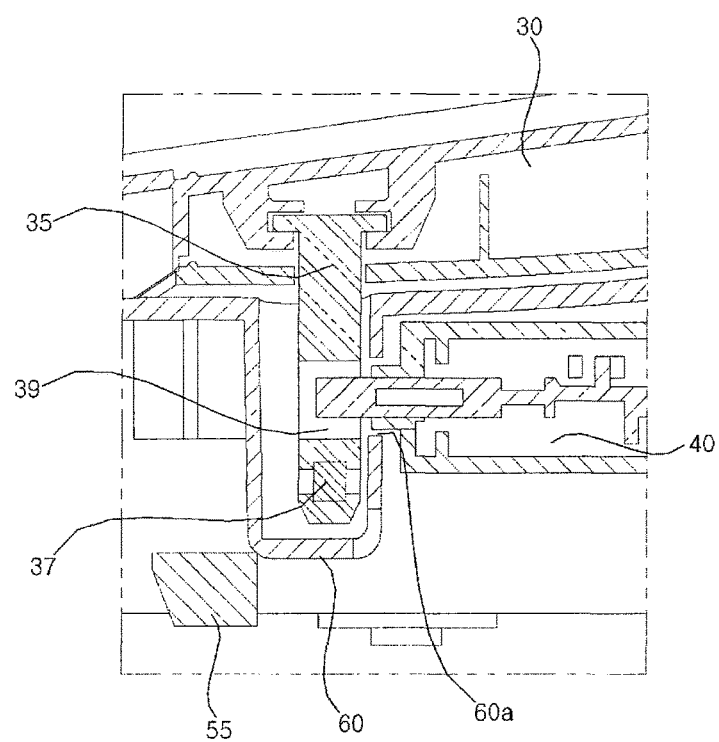
FIGS. 13A-13C are a side cross-sectional views of sensor housings and components adjacent thereto according to various embodiments as broadly described herein.
Figure 13B:
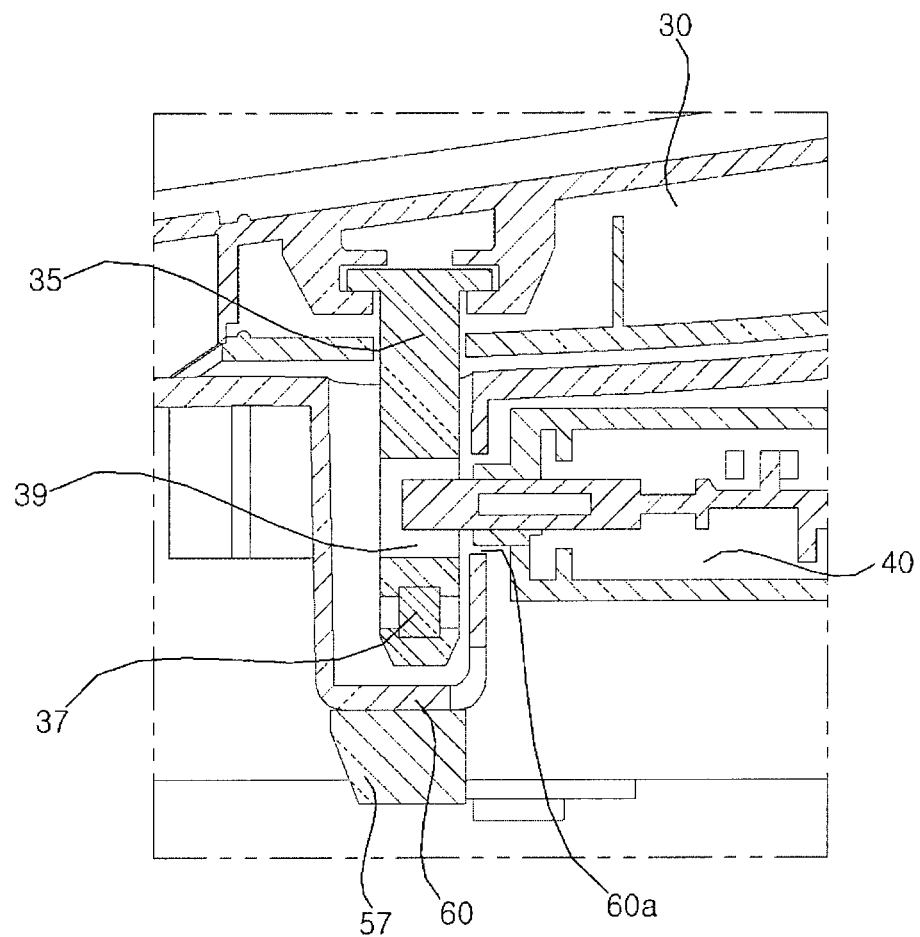
Figure 13C:
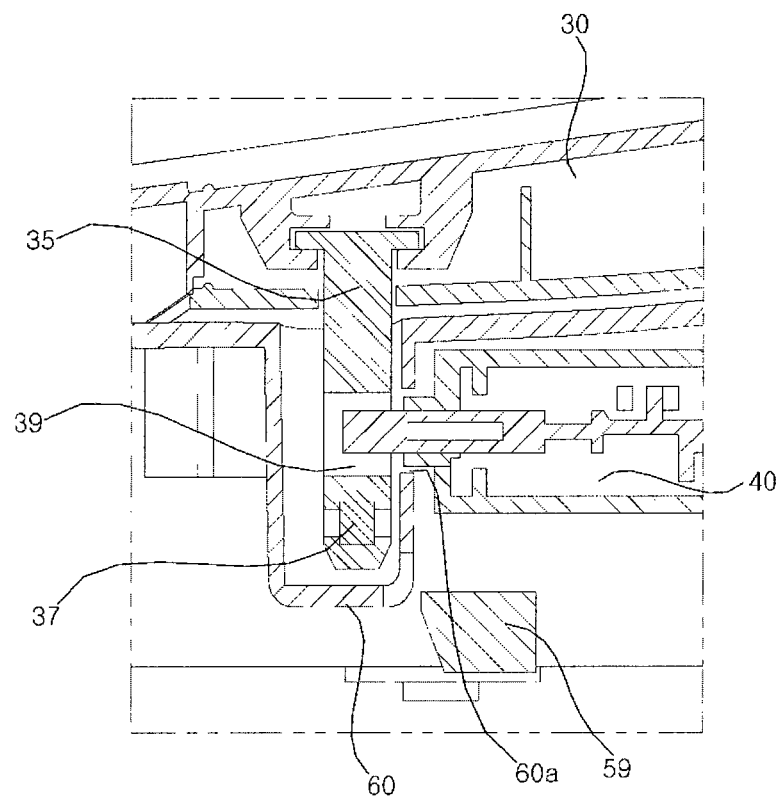

Referring to FIG. 10, the washing machine 1 may further include sensor housing 53 (or sensor housing 55, 57 or 59, as shown in FIGS. 13A-13C) disposed in the main body 50 to receive reed sensors 110 and 120, and the circuit boards 300 and 350 may be inserted into the sensor housings 53, 55, 57 and 59 only in one direction.

The circuit boards 300 and/or 350 may include a fitting part 300a having a protrusion or a groove at one side thereof. The sensor housings 53, 55, 57 and 59 may include the mounting parts 113 and 123 matching the fitting part 300a in shape. The fitting part 300a may be a protrusion formed on the circuit boards 300 and/or 350. The fitting part 300a may be a groove formed in the circuit boards 300 and/or 350. The mounting parts 113 and 123 may match the fitting part 300a in shape. The circuit boards 300 and 350 may be mounted only in one direction.

Figure 11:
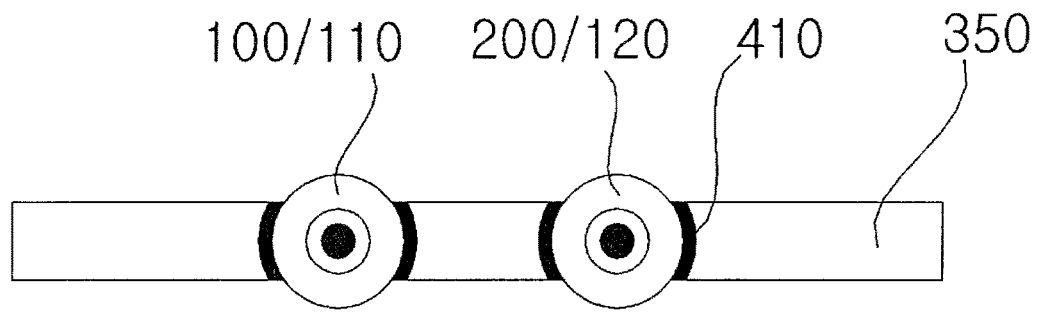
FIG. 11 illustrates a fixing member surrounding a reed sensor according to an embodiment as broadly described herein.
Figure 12:
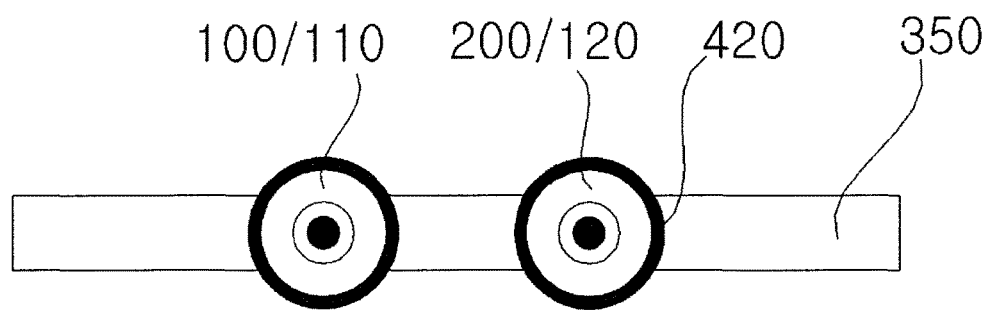
FIG. 12 illustrates a fixing member surrounding a reed sensor according to another embodiment as broadly described herein.

Referring to FIGS. 11 and 12, the reed sensors 100/110 and 200/120 may be fixed by a fixing member surrounding the reed sensors 100 and 200. The fixing member may maintain intervals between the reed sensors 110 and 120. The fixing member may absorb an impact applied to the reed sensors 110 and 120. The fixing member may be formed of foaming polystyrene.

The fixing member may be formed of, for example, an epoxy resin or an elastomer, and may have an arcuate shape 410 or a circular ring shape 420.

The fixing member may fix the reed sensors 110 and 120 to the sensor housings 53, 55, 57 and 59. The fixing member may fix the reed sensors 110 and 120 to the circuit boards 300 and 350. The fixing member may be filled between the reed sensors 110 and 120 and the circuit boards 300 and 350. The fixing member may be inserted into a space between the bridge 355 and the reed sensors 110 and 120.

Referring to FIGS. 6 to 12, a distance sensor according to an embodiment as broadly described herein may generate an on or off signal when the magnet 37 approaches within a certain distance. In this distance sensor, a plurality of reed sensors reacting to one magnet 37 may be connected to each other. Such a distance sensor may include reed sensors 100/110 and 200/120 generating an on or off signal when a magnet 37 approaches within a certain distance; and circuit boards 300/350 in which the reed sensors 100/110 and 200/120 are mounted. The reed sensors 100/110 and 200/120 may be disposed in plurality. The circuit boards 300/350 may include a circuit disposed in a diagonal direction and connecting the plurality of reed sensors 100/110 and 200/120. The plurality of reed sensors 100/110 and 200/120 may be horizontally disposed across the circuit disposed in the diagonal direction.

The reed sensors 100/110 and 200/120 may be connected in series or in parallel to each other. Preferably, the reed sensors 100/110 and 200/120 may be connected in series to each other. The reed sensors 100/110 and 200/120 may react to one magnet 37. The reed sensors 100/110 and 200/120 may substantially simultaneously react to one magnet 37. The reed sensors 100/110 and 200/120 may be mounted in the circuit boards 300/350.

Magnetization parts 105/115 and 205/125 disposed at both sides of the reed sensors 100/110 and 200/120 may have different lengths. One end of the reed sensors disposed in the circuit boards may be connected to one end of other reed sensor disposed in a diagonal direction. The reed sensors may be fixed by a fixing member 410/420 as discussed above.

The reed sensors 100/110 and 200/120 may be inserted into the sensor housings 53, 55, 57 and 59. The circuit boards 300/350 may include a fitting part 300a. The sensor housings 53, 55, 57 and 59 may include mounting parts 103/113 and 203/123.

Referring to FIGS. 2 to 9C, a washing machine 1 according to an embodiment as broadly described herein may include the main body 50 having the laundry loading hole for laundry, a protruding part 35 disposed on the door 30 opening/closing the laundry loading hole, protruding downwardly, and including the magnet 37 disposed therein, and a plurality of reed sensors 100/110 and 200/120 reacting to the magnet 37 to sense the opening of the door 30.

In certain embodiments, a protrusion housing 60 may be provided in the main body 50 to receive the protruding part 35, and a plurality of reed sensors 100/110 and 200/120 may be disposed outside the protrusion housing 60 and reacting to the magnet 37 to sense the opening of the door 30. The plurality of reed sensors 100/110 and 200/120 may be disposed at the front side of the protrusion housing 60.

The laundry loading hole may be formed in the main body 50. The door 30 may open or close the laundry loading hole. The door 30 may be disposed on the main body 50. The door 30 may be pivotably connected to the main body 50. The protruding part 35 may be disposed on the door 30.

The protruding part 35 may be disposed on the door 30 to downwardly protrude. The magnet 37 may be disposed in the protruding part 35. The magnet 37 may be disposed in the door 30. Preferably, the magnet 37 may be disposed in the protruding part 35. The reed sensors 100/110 and 200/120 may react to the magnet 37. The reed sensors 100/110 and 200/120 may sense the opening/closing of the door 30. The reed sensors 100/110 and 200/120 may be disposed in plurality. The reed sensors 100/110 and 200/120 may react to the magnet 37 disposed in the protruding part 35.

In one embodiment, when the reed sensor disposed farthest from the magnet 37 reacts to the magnet, the reed sensor disposed closest to the magnet 37 may also react to the magnet 37. The reed sensors may substantially simultaneously react to one magnet 37. When the reed sensor disposed farthest from the magnet 37 senses the opening of the door 30, the reed sensor disposed closest to the magnet 37 may also sense the opening of the door 30.

In one embodiment, the washing machine 1 may include the drum 90, the operation of which is stopped when any one of the reed sensors senses the opening of the door 30. The plurality of reed sensors that are connected in series may be electrically connected to a controller 70.

The reed sensors may react to the magnet 37. The reed sensors may sense the opening/closing of the door 30. The reed sensors may deliver data on the opening/closing of the door 30 to the controller 70.

The controller 70 may also be connected to the drum 90. The controller 70 may control the operation of the drum 90. The controller 70 may determine whether or not the drum 90 operates. The controller 70 may determine whether or not the drum 90 stops. The controller 70 may control the cycle of the washing machine 1. The controller 70 may stop the cycle of the washing machine 1.

In one embodiment, the reed sensors may be longitudinally disposed from side to side, and may be disposed at a further rear side when located at a lower side. The reed sensors may be disposed back and forth. The reed sensors may be disposed from side to side.

The plurality of reed sensors may be longitudinally disposed from side to side, and may be stacked in a vertical direction. Also, the reed sensors may become closer to the hinge axis when located at a lower side.

The reed sensors may be disposed toward the magnet 37. The reed sensors may be disposed at different heights. As a horizontal distance between the reed sensors and the magnet 37 decreases, the reed sensors may be disposed at a further rear side. The reed sensors may be disposed at a further rear side when located at a lower side. The reed sensors may be disposed at a further front side when located at an upper side.

The reed sensors may include, for example, the first reed sensor 110 and the second reed sensor 120 connected to the first reed sensor 110. The first and second reed sensors 110 and 120 may be disposed in parallel in a longitudinal direction. The second reed sensor 120 may be disposed in a radiation direction of the first reed sensor 110.

FIGS. 13A-13C are side cross-sectional views of sensor housings 55, 57 and 59 and components adjacent thereto according to various embodiments as broadly described herein.

As discussed above, the reed sensors 100/110 and 200/120 may be disposed around a protruding part 35, within working distances d1, d2, d3 and d4 from the magnet 37.

The reed sensors 100/110 and 200/120 may also be disposed at the side surface of the protruding part 35. The reed sensors 100/110 and 200/120 may be disposed at a lower end of the protruding part 35. The reed sensors 100/110 and 200/120 may be disposed in a diagonal direction of the protruding part 35.

The reed sensors 100/110 and 200/120 may be disposed at a front side of the protruding part 35. The reed sensors 100/110 and 200/120 may be disposed at a lower location than the magnet 37 when the door 30 closes the main body 50

In one embodiment, the protruding part 35 may have a fitting hole 39 extending in a horizontal direction. The main body 50 may further include a locking part 40 coupled to the fitting hole 39 to lock the door 30.

The locking part 40 may also be disposed at a side surface or front side of the protruding part 35. The locking part 40 may be disposed at a rear side of the protruding part 35. The locking part 40 may be disposed in the main body 50. The locking part 40 may be fitted into the fitting hole 39 formed in the protruding part 35. The fitting hole 39 may be formed in the side surface where the locking part 40 is disposed.

The reed sensors 100/110 and 200/120 may be disposed at a front side of the protruding part 35. The reed sensors 100/110 and 200/120, the protruding part 35, and the locking part 40 may be disposed in a line back and forth, and may have different horizontal heights.

The magnet 37 may be disposed under the fitting hole 39. The magnet 37 may be disposed at a rear side of the reed sensors 100/110 and 200/120. The fitting hole 39 may be formed over the magnet 37. The locking part 40 may be formed over the magnet 37. The locking part 40 may be fitted into the fitting hole 39 formed over the magnet 37.

The protrusion housing 60 may be disposed in the main body 50 to receive the protruding part 35 when the door 30 is in a closed state. The reed sensors 100/110 and 200/120 may be disposed at the front side of the protrusion housing 60.

The sensor housings 53, 55, 57 and 59 may be disposed at a front side of the protrusion housing 60. The sensor housings 53, 55, 57 and 59 may be disposed around the protrusion housing 60. The locking part 40 may be disposed around the protrusion housing 60. The protruding part 35 may be housed in the protrusion housing 60.

The protrusion housing 60 may have a through hole 60a. The locking part 40 may penetrate the through hole 60a such that the locking part 40 can be inserted into the fitting hole 39. The through hole 60a may allow the locking part 40 to pass through and communicate with the fitting hole 39. The locking part 40 may pass the fitting hole 39 and the through hole 60a while moving forward and backward.

Figure 14:
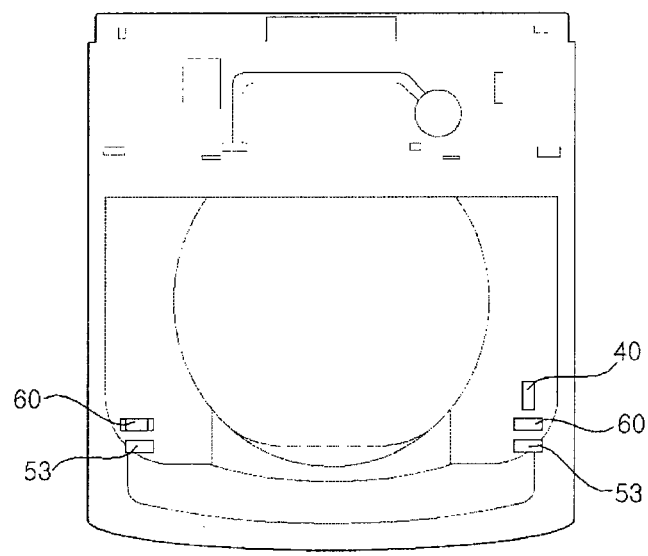
FIG. 14 is a front view of a sensor housing, a protrusion housing, and a locking member mounted in a main body according to an embodiment as broadly described herein.

FIG. 14 is a front view illustrating an arrangement of sensor housings 53, 55, 57 and 59 (in particular, sensor housing 53, which may be any one of sensor housings 53, 55, 57 or 59 as previously discussed), the protrusion housing 60, and the locking member 40 mounted in the main body 50.

Referring to FIG. 14, the protruding part 35 may be disposed at a front side of the side surface of the door 30. The protruding part 36 may be formed to be inserted into the main body 50. The protruding part 35 and the reed sensors 100/110 and 200/120 may be disposed at both side surfaces of the door 30, respectively. The protruding part 35 may be disposed at a surface corresponding to an edge of the laundry loading hole. The protruding part 35 may be disposed in plurality on the door 30, and the plurality of reed sensors 100/110 and 200/120 may be disposed in plurality for each protruding part 35.

When the protruding part 35 is disposed at the both sides, the protruding part 35 disposed at one side surface may not include the magnet 37. The reed sensors 100/110 and 200/120 may not be disposed at a location where the protruding part 35 without the magnet 37 is disposed. When the protruding part 35 is disposed at the both sides of the door 30, the locking part 40 may also be disposed only at one side of the door 30. The locking part 40 may be disposed at the both sides of the door 30.

The protruding part 35 and the reed sensors 100/110 and 200/120 may be disposed at both sides of the front side of the door 30, respectively.

Figure 15:
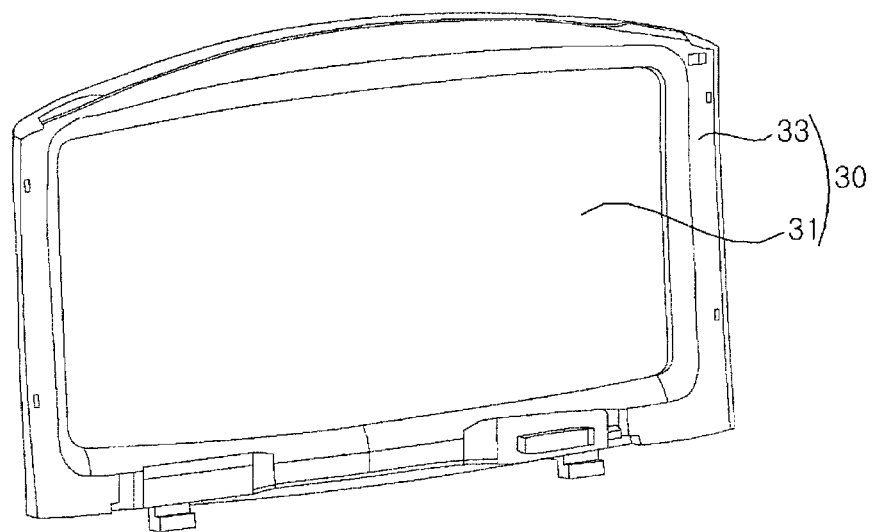
FIG. 15 is a perspective view of a door and a reinforcing member according to an embodiment as broadly described herein.

FIG. 15 is a perspective view of the door 30 and a reinforcing member 31 according to an embodiment as broadly described herein.

Referring to FIG. 15, the reinforcing member 31 may be disposed at the center of the door 30 to prevent a deformation of the door 30. The reinforcing member 31 may also be disposed at a side surface of the door 30. The reinforcing member 31 may be a panel formed of glass. Synthetic resin may surround the edge of the reinforcing member 31. The panel formed of glass may be fitted into a frame 33 formed of synthetic resin.

Hereinafter, the operation of the washing machine 1 and the distance sensor configured as above will be described as follows.

When the door 30 approaches the laundry loading hole formed in the main body 50, the magnet 37 may approach the reed sensors. When the magnet 37 approaches the reed sensors within the working distances d1, d2, d3 and d4, the reed sensors may determine that the door 30 closes the laundry loading hole. The reed sensors may provide data to the controller 70. The controller 70 may use the data to start operating according to demands of a user.

When any one of reed sensors cannot sense the closing of the door 30, the controller 70 may not start operating. At least, the controller 70 may not start the operation of the drum 90. That is, the controller 70 may start operating only when all reed sensors determine that the door is closed.

The door 30 may be opened during the operation of the washing machine 1. In this case, the magnet 37 disposed in the door 30 may move away from the reed sensors. When the reed sensors move away, a magnetic force may weaken, allowing the contact parts to be separated by an elastic force that the reed pieces inherently have. In this case, the reed sensors may sense the opening of the door 30. and may deliver data on the opening of the door 30 to the controller 70.

The controller 70 may stop the operation of the drum 90. The controller 70 may control all operations of the washing machine 1 as well as the operation of the drum 90. The controller 70 may control spray of steam, operation of the drum 90, and water supply.

In typical operation, the door 30 of the washing machine 1 may remain closed for a relatively long time. In this case, the reed sensors may be continuously magnetized by the magnet 37. Accordingly, an error may occur in the reed sensors. That is, even when the magnet 37 moves out of the working distances d1, d2, d3 and d4 of the reed sensors, the contact parts may be still in contact with each other.

However, according to an embodiment as broadly described herein, since the reed sensors are disposed in plurality, thus avoiding the foregoing error and possible damage.

In embodiments as broadly described herein, the reed sensors may substantially simultaneously react to one magnet 37. Accordingly, all reed sensors may recognize the opening of the door 30 at the same time when the magnet 37 opens the door 30. Thus, an error caused when only one of reed sensors recognizes the opening or closing of the door 30 can be prevented.

Also, the controller 70 can quickly recognize the opening/closing of the door 30. Furthermore, when the door 30 closes the main body 50, the distance between the reed sensors and the magnet 37 may become very close. Accordingly, the reed sensors can be efficiently disposed.

In order to allow the reed sensors 100 and 200 and the magnet 37 to substantially simultaneously operate, the reed sensors 100 and 200 may be diagonally disposed, or the reed pieces may have different lengths.

This means that it is not necessary to provide various different types of reed sensors to achieve this. That is, since the components are simplified and the types of components are reduced, the manufacturing cost can be reduced, and the manufacturing process can be simplified.

Also, since the reed sensors react to one magnet 37, the reed sensors can be disposed in one sensor housing 53, 55, 57 or 59. Thus, the freedom of design can be enhanced.

Further, since the reed sensors can be connected in series, a single controller can be used to sense the opening/closing of the door. Also, since the reed sensors are mounted in the circuit boards, and the fitting part and the mounting parts are provided so as to be mounted only in one direction with respect to the sensor housings, an error that may occur during the assembling can be prevented.

Furthermore, the fixing member may surround the reed sensors. The door may apply an impact to the main body when closed, and this impact may cause a malfunction of the reed sensors. Accordingly, the fixing member may serve to ensure the normal operation of the reed sensors by protecting the reed sensors from the impact.

Also, the circuit that connects the reed sensors to be disposed in the circuit boards may be connected in a diagonal direction. Thus, a magnetic force generated by one magnet can influence all of the plurality of reed sensors.

Regarding the effect of the distance sensor configured as above, since the plurality of reed sensors react to one magnet, the reliability of the reed sensors can be improved.

Since the plurality of reed sensors react when an object with the magnet approaches within a certain range, the plurality of reed sensors can be utilized as the distance sensor. The distance sensor can be applied to all fields in which a distance from an object with the magnet needs to be sensed. That is, the reed sensors can be applied to all fields in which the reliability of products needs to be improved by fundamentally removing limitations generated from errors of the reed sensors.

A plurality of reed sensors having improved reliability are provided.

A plurality of reed sensors are provided, which simultaneously react to one magnet.

A plurality of reed sensors are provided, which are efficiently disposed together with a locking member.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A washing machine, comprising:
   a main body having a laundry loading hole formed therein;

a door coupled to the main body to selectively open and close the laundry loading hole;
a protruding part that protrudes from the door toward the main body;
at least one magnet provided within the protruding part;
a protrusion housing provided in the main body and configured to receive the protruding part; and
a plurality of reed sensors provided in the main body,
wherein the plurality of reed sensors is provided outside of the protrusion housing and configured to react to the at least one magnet to sense the opening of the door,
wherein the protruding part further includes a fitting hole that extends in a horizontal direction, and the main body further includes a locking part that couples to the fitting hole to lock the door,
wherein the at least one magnet is provided under the fitting hole and the locking part is provided over the at least one magnet when the locking part is coupled to the fitting hole,
wherein the plurality of reed sensors, the protruding part, and the locking part have different horizontal heights,
wherein the plurality of reed sensors, the protruding part, and the locking part are provided in a line such that the plurality of reed sensors are provided at a front side of the protruding part and the protruding part is provided at a front side of the locking part,
wherein the locking part passes through the fitting hole by moving frontward and backward,
wherein the plurality of reed sensors includes a first reed sensors and a second reed sensor connected to the first reed sensor,
wherein the plurality of reed sensors are mounted on a circuit board, the circuit board comprising:
first insertion holes respectively receiving two opposite ends of the first reed sensor; and
second insertion holes respectively receiving two opposite ends of the second reed sensor,
wherein a distance between the first reed sensor and the at least one magnet is less than a distance between the second reed sensor and the at least one magnet, and an interval between the first insertion holes is less than an interval between the second insertion holes,
wherein the circuit board has a dumbbell shape having first and second end portions connected by a bridge,
wherein one first insertion hole and one second insertion hole is formed in each of the first and second end portions of the circuit board, and
wherein the first reed sensor and the second reed sensor are arranged in parallel along the bridge connecting the first and second end portions of the circuit board.

2. The washing machine of claim 1, wherein, when one of the plurality of reed sensors farthest from the at least one magnet senses that the door is open, another of the plurality of reed sensors closest to the at least one magnet also senses that the door is open.

3. The washing machine of claim 2, wherein the plurality of reed sensors are connected in series so as to be electrically connected to the controller.

4. The washing machine of claim 3, wherein, as a distance between the plurality of reed sensors and the at least one magnet increases, a length of a wire connected to two opposite ends of the plurality of reed sensors increases.

5. The washing machine of claim 3, wherein, as a distance between the plurality of reed sensors and the at least one magnet increases, a length of a magnetization part of each of the at least one reed sensors that is magnetized by the at least one magnet increases.

6. The washing machine of claim 1, wherein the first reed sensor and the second reed sensor are arranged in parallel in a longitudinal direction thereof.

7. The washing machine of claim 6, wherein a center of the first reed sensor and a center of the second reed sensor are aligned with each other.

8. The washing machine of claim 7, wherein the at least one magnet pivots toward the centers of the first reed sensor and the second reed sensor.

9. The washing machine of claim 1, wherein the first reed sensor and the second reed sensor are arranged longitudinally, side to side.

10. The washing machine of claim 9, wherein at least one of the first insertion holes and at least one of the second insertion holes are electrically connected in a diagonal direction.

11. The washing machine of claim 1, further comprising a circuit provided on the bridge, the circuit connecting the first reed sensor and the second reed sensor in series.

12. The washing machine of claim 1, further comprising a sensor housing provided in the main body to receive the first and second reed sensors, wherein the circuit board is inserted into the sensor housing in a single direction.

13. The washing machine of claim 12, wherein the circuit board comprises a fitting portion at one end thereof, the fitting portion comprising one of a protrusion or a groove, and wherein the sensor housing comprises a mounting portion having a shape that corresponds to the fitting portion of the circuit board.

14. The washing machine of claim 10, further comprising a plurality of fixing members respectively surrounding the plurality of reed sensors, each of the fixing members comprising an epoxy resin material formed in an arcuate shape or an elastomer material formed in a ring shape.

15. The washing machine of claim 14, wherein the plurality of reed sensors, the protruding part, the locking part, and the protrusion housing are provided at a front of the washing machine.

16. The washing machine of claim 1, wherein a width of the bridge is smaller than a width of the first and second end portions, and the first and second reed sensors are provided at a position that does overlap with the bridge.

* * * * *